(12) United States Patent
Bonneau et al.

(10) Patent No.: US 6,529,474 B1
(45) Date of Patent: Mar. 4, 2003

(54) SHAPING ALGORITHM

(75) Inventors: Marie-Claude Bonneau, Gatineau (CA); Stanko Gligorije Vuleta, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/360,648

(22) Filed: Jul. 26, 1999

(51) Int. Cl.[7] .............................................. H04L 12/28
(52) U.S. Cl. .................................. 370/230; 370/395.4
(58) Field of Search ........................... 370/230, 230.1, 370/232, 233, 234, 412, 468, 235, 395.4, 395.41, 395.43

(56) References Cited

U.S. PATENT DOCUMENTS

| | | | | |
|---|---|---|---|---|
| 5,926,459 A | * | 7/1999 | Lyles et al. | 370/230 |
| 6,058,114 A | * | 5/2000 | Sethuram et al. | 370/231 |
| 6,320,845 B1 | * | 11/2001 | Davie | 370/230 |
| 6,343,076 B1 | * | 1/2002 | Ha-Doung et al. | 370/389 |
| 6,396,843 B1 | * | 5/2002 | Chiussi et al. | 370/389 |
| 6,438,134 B1 | * | 8/2002 | Chow et al. | 370/230 |

OTHER PUBLICATIONS

Jennifer Rexford, et al. document entitled "Scalable Architectures for Integrated Traffic Shaping and Link Scheduling in High–Speed ATM Switches"; IEEE Journal on Selected Areas in Communications, vol. 15 dated Jun. 1997.
The ATM Forum document entitled "Traffic Management Specification Version 4.0" dated Apr. 1996.

* cited by examiner

*Primary Examiner*—Chau Nguyen
*Assistant Examiner*—Keith M. George
(74) *Attorney, Agent, or Firm*—Marks & Clerk

(57) ABSTRACT

A shaping algorithm for use in a queuing system in which there is no background process for detecting clock wrap around. The algorithm applies to Asynchronous Transfer Mode (ATM) applications and to the different categories of service connections specified by the ATM Forum. The algorithm is implemented by a time slotted calendar system to shape cell streams into conformance with network traffic descriptors. The calendar register is constrained to positive values to ensure valid results from the maximum functions carried out by the Algorithm. The register is divided into quadrants and the location of theoretical cell emission times relative to current and next time slots within the quadrants is used to detect clock wrap around.

14 Claims, 7 Drawing Sheets

LET 2Q REPRESENT (2 x LENGTH OF ONE QUADRANT)

LET 2Q REPRESENT (2 x LENGTH OF ONE QUADRANT)

SHAPING ALGORITHM

FIELD OF THE INVENTION

The invention relates to traffic shaping in an Asynchronous Transfer Mode (ATM) application and more particularly to an algorithm that can be implemented in ATM queuing systems where cells need to be shaped in order to be conformant to downstream Usage Parameter Control (UPC) traffic descriptors.

BACKGROUND OF THE INVENTION

Asynchronous Transfer Mode (ATM) is a packet based communications system well suited to the delivery of high-speed traffic including data, voice and video. In ATM a packet is a fixed length cell including a 5 byte header and a 48 byte payload. In order to accommodate the different types of service, i.e. voice, video, file transfer etc, delivered by an ATM network, the ATM Forum Traffic Management working group has defined five service categories, namely constant bit rate (CBR), real-time variable bit rate (rtVBR), non-real-time variable bit rate (nrtVBR), available bit rate (ABR), and unspecified bit rate (UBR) which are distinguished by the parameter sets which describe source behavior and quality of service (QoS) guarantees. The ATM Forum Traffic Management working group has also identified a mechanism to ensure conformance of a stream of cells. This mechanism is called traffic shaping and is defined as "a mechanism that alters the traffic characteristics of a stream of cells on a connection to achieve better network efficiency while meeting the QoS objectives, or to ensure conformance at a subsequent interface". Conformance is defined based on an algorithm known as the Generic Cell Rate Algorithm (GCRA). Conformance for an ABR connection is network specific while conformance for a CBR and UBR connection is characterized by a Peak Cell Rate (PCR) parameter with a corresponding Cell Delay Variation Tolerance (CDVT) to account for delays at queuing points within the network. Additionally, the ability of the cell stream to withstand end to end cell loss depends on the type of communication carried by connection. Categories having low tolerance for cell loss are marked CLP=0 while categories having higher cell loss tolerance are marked CLP=1 where CLP is Cell Loss Priority. CLP=1 cells may be dropped or discarded in the event of network congestion. Aggregate traffic carrying different cell loss priorities are designated CLP=0+1.

Conformance for a rt-VBR or nrt-VBR connection is characterized by a Sustainable Cell Rate (SCR) parameter and a corresponding Maximum Burst Size (MBS) parameter, in addition to a PCR and a corresponding CDVT for the CLP=0+1 flow. A traffic shaping algorithm must thus yield a conformant cell stream and must maintain the sustained cell rate or peak cell rate requested.

The shaping algorithms known in the prior art, (see for example, J. Rexford et al "Scalable Architectures for Integrated Traffic Shaping and Link Scheduling in High-Speed ATM Switches", IEEE Journal on Selected Areas in Communications, Vol. 15, No. 15, June 1997) ensure that a VBR connection is conformant to GCRA(1/PCR, CDVT) and GCRA(1/SCR, BT+CDVT), and ensure that a CBR or UBR connection is conformant to GCRA(1/PCR, CDVT) on queuing systems where a clock wrap around can be identified and where the state of each connection can be updated independent of cell arrivals. In this description wrap around is the action of a counter (clock in this case) that starts over at zero or at minus infinity after its maximum value has been reached, and continues to increment, either because it is programmed to do so or because of an overflow.

On current queuing systems with a single processor, it is not possible to identify clock wrap around. The algorithm described in the above identified prior art uses a maximum function to determine the schedule time of a cell. When a wrap around occurs and it is not detected, the maximum function will return erroneous values. The shaping algorithm described in the Rexford et al article then fails to maintain the requested sustain cell rate or peak cell rate.

Although the above example is not an exhaustive list of prior art, all known shaping algorithms do not simultaneously yield a conformant cell stream and maintain the sustained cell rate or peak cell rate requested in queuing systems where a clock wrap around cannot be identified.

SUMMARY OF THE INVENTION

The present invention is applicable to queuing systems where clock wrap around occurs and there is no background process to detect clock wrap around. The algorithm is described in its application to Constant Bit Rate (CBR), Real and non-real time Variable Bit Rate (VBR), Available Bit Rate (ABR) and Unspecified Bit Rate (UBR) service categories.

With this invention, the algorithm described in Rexford et al is modified such that a cell stream is conformant to GCRA and its SCR or PCR is maintained even on queuing systems where a clock wrap around may be encountered and is not detected.

Therefore in accordance with a first aspect of the present invention there is provided a method of shaping cell traffic at a queuing system for conformance with downstream traffic descriptors comprising: providing a calendar system having a register with a plurality of time slots for indicating emission times of cells awaiting service; limiting the register to positive values; dividing the positive time slot register into quadrants; comparing quadrant location of a theoretical emission time of a cell on the register with quadrant location of a next cell service time slot; and determining a scheduled emission time based on the comparison.

The algorithm according to the invention is capable of shaping traffic in a queuing system without means to detect clock wrap around.

According to a second aspect of the invention there is provided a queuing system having a shaper for conforming Asynchronous Transfer Mode (ATM) cell traffic to traffic descriptors comprising: a calendar register in said shaper having a plurality of time slots for indicating servicing sequences of cell traffic awaiting service; means to constrain the calendar register to positive time values; means to divide the positive time values into quadrants; means to calculate a Theoretical Emission Time (TET) of a cell based on Peak Cell Rate (PCR) and Cell Delay Variation Tolerance (CDVT) parameters; and means to compare the TET_PCR with a next time slot location on the register to determine the scheduled service time of a cell.

The system according to the second aspect of the invention implements an algorithm known as a single leaky bucket and is used to conform CBR and UBR categories of service. A dual leaky bucket algorithm can also be implemented by this system and includes means to calculate a theoretical emission time (TET) of a cell based on peak cell rate (PCR) and cell delay variation tolerance (CDVT) parameters and sustainable cell rate (SCR) as well as burst tolerance (BT) and cell delay variation tolerance (CDVT) parameters.

BRIEF DESCRIPTION OF THE DRAWINGS

The invention will now be described in greater detail with reference to the attached drawings wherein.

DETAILED DESCRIPTION OF THE INVENTION

Figure 1:
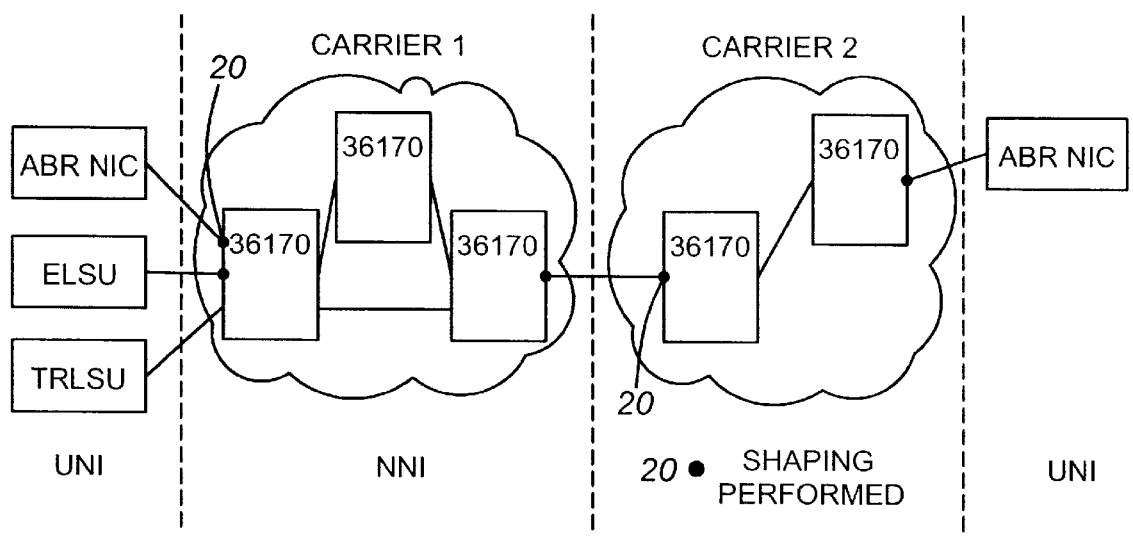
FIG. 1 illustrates a multi-carrier network with potential shaping points.

FIG. 1 illustrates a two carrier network with multi-services switches such as Newbridge Network's MainStreetXpress 36170s within each carrier "cloud". Network interface cards are located at user locations outside the carrier networks. Shaping is performed at several locations within the network such as at points 20 in FIG. 1. Ideally, shaping should be performed at the edges of the network in both ingress and egress directions. Ingress shaping provides better service than downstream Usage Parameter Control (UPC) since non-conforming cell streams are buffered and then shaped instead of being discarded.

This improves both switch and network performance. Egress shaping ensures conformance of outgoing cell streams with respect to their traffic descriptors. This allows performance improvement in downstream nodes as cell stream characteristics are known. As well, performing egress shaping gives the assurance that the outgoing cell stream will meet the UPC requirements of other networks.

Figure 2:
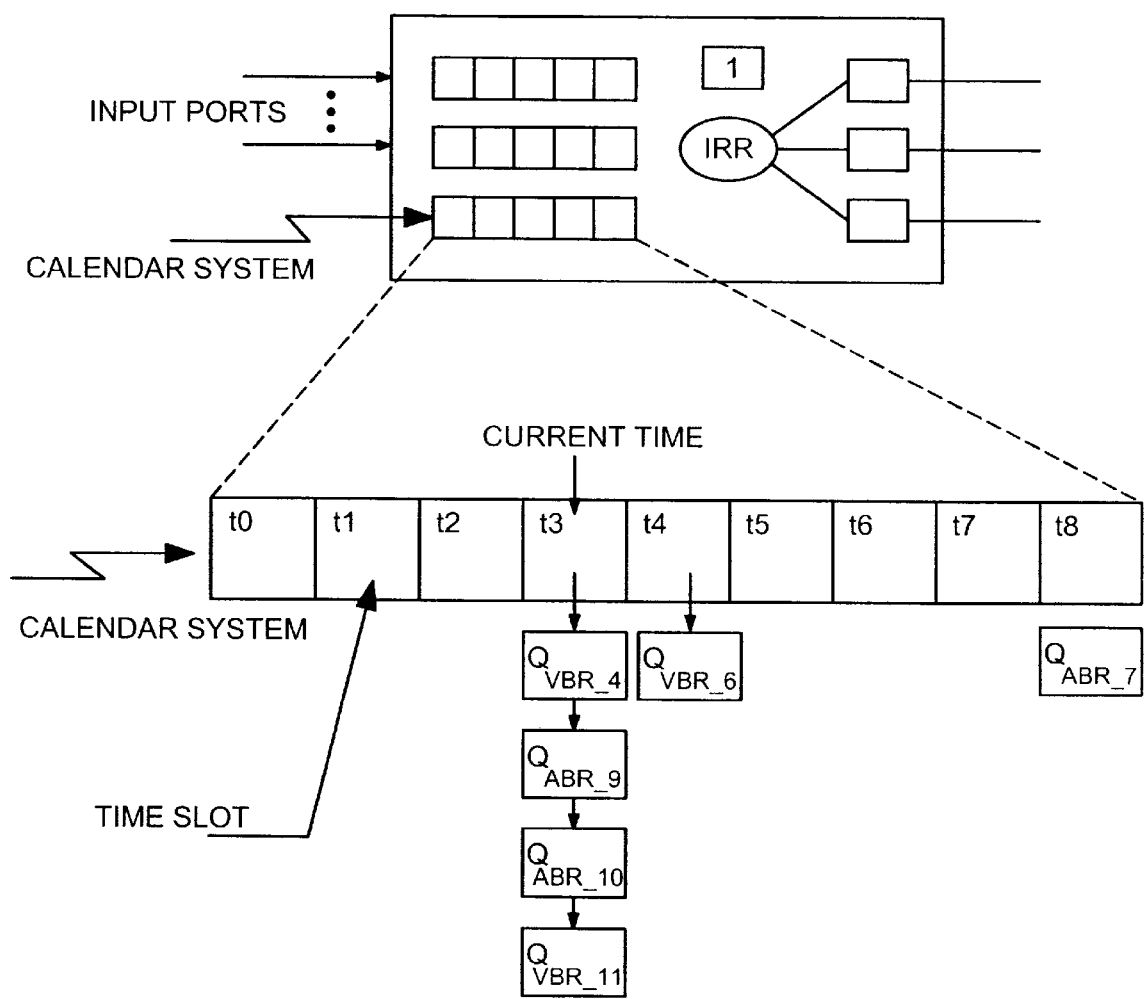
FIG. 2 illustrates a queuing system with calendar register.

As shown in FIG. 1 shaping may be performed in selected switches. In the MainStreetXpress 36170 shaping is typically performed by a Multiservice Traffic Shaping Module (MTSM) utilizing a queuing system and a calendar system as shown in FIG. 2. Cell services on the queuing system are granted based on priority and virtual channel through a calendar system. The calendar can be viewed as a finite time slotted array where one cell service is granted per time slot. Cells waiting to be serviced in the calendar system are stored in a queue based on their priority and virtual channel. These queues are ordered per priority and the service time of the cell at the head of the queue is calculated via a shaping algorithm such as the algorithm of the present invention.

Figure 3:
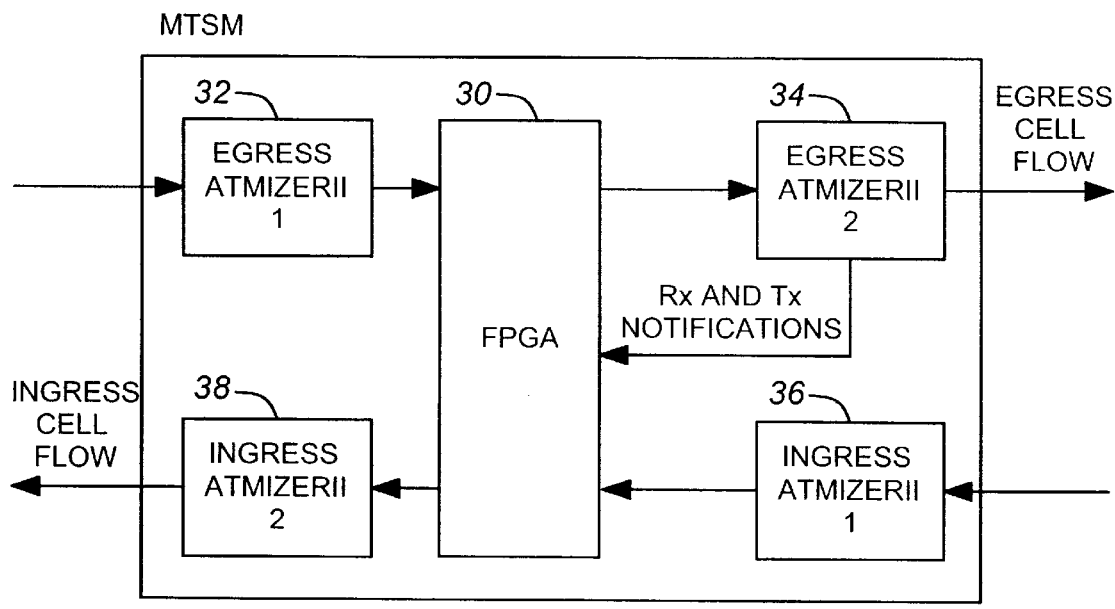
FIG. 3 is a simplified block diagram of a multi-service traffic shaping module (MTSM)

FIG. 3 shows a simplified block diagram of a multi-service traffic shaping module (MTSM) showing a field programmable gate array 30 (FPGA) and four ATM cell processors 32, 34, 36 and 38. An example of an ATM cell processor is an ATMizerII which is available from LSI Logic Corporation. FIG. 3 shows a possible location of the ATMizerII units in the cell data path. Egress ATMizerII 34 and ingress ATMizerII 38 are both responsible for shaping the virtual channel. It uses a calendar based scheme to determine when in time a particular virtual channel should be serviced.

Depending on the service category, a single or dual GCRA algorithm may be implemented. As discussed previously, the ATM Forum Traffic Management Specification, Version 4.0 defines the Generic Cell Ratio Algorithms for both single and dual "leaky bucket" implementations. The single GCRA applies in particular to the CBR and UBR categories of service in which the cell stream is based on PCR and CDVT. The dual GCRA applies to VBR category of service traffic where the Sustainable Cell Rate (SCR) and Burst Tolerance are considered in addition to PCR and CDVT.

For the present invention TET_PCR is used to denote the theoretical emission time of a cell based on GCRA(1/PCR, CDVT) and TET_SCR denotes the theoretical emission time of a cell based on GCRA(1/SCR, BT+CDVT).

In the Rexford et al system discussed previously the shaper entity is provided with the additional hardware necessary to handle clock rollover. This hardware is needed to correctly differentiate between large values of time (t) prior to rollover and small values of time (t) after rollover. Implementation of the algorithm of the present invention leads to the correct values of time (t) without the underlying processors necessary to detect wrap around.

The algorithm of the present invention ensures that a VBR connection is conformant to GCRA(1/PCR, CDVT) and GCRA(1/SCR, BT+CDVT) and that CBR and UBR connections are conformant to GCRA(1/PCR, CDVT) on an infinite time line. In reality, the time and TET values are stored on a finite time calendar and values wrap around. Systems with multiple processors as discussed in the prior art can identify clock wrap around and can update the state of each connection independent of cell arrivals. Since the MTSM card has only one processor, it is not feasible to detect clock wrap around in this manner. The algorithm must therefore recognize clock wrap around without the need of a background process.

Figure 4:
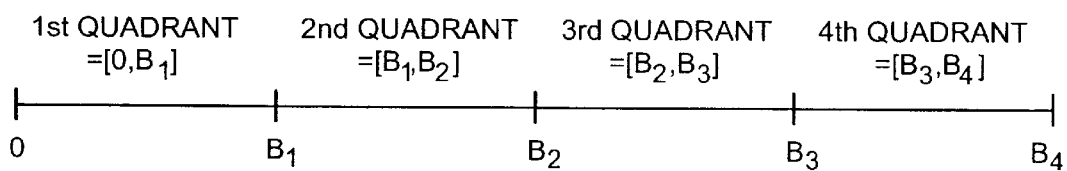
FIG. 4 illustrates a finite register having positive number representation and divided into quadrants.

It is to be noted that for the MTSM, the first half of the time calendar represents positive numbers while the second half of the time calendar represents negative numbers. When two numbers are not within the same half of the time calendar, the value returned by a maximum function may be erroneous since the maximum function implemented on the MTSM card is a signed maximum function. In order to avoid signed arithmetic, the region of operation is restrained to be within the first half of the time calendar. This is equivalent to having a smaller time calendar with only positive number representation and implies that clock wrap around will occur more often. FIG. 4 illustrates a time calendar with only positive number representations where $B_1$, $B_2$, $B_3$, and $B_4$ represent the time boundaries of each quadrant.

As specified in the aforementioned Traffic Management Specification V4.0, conformance for a rt-VBR or nrt-VBR connection is characterized by an SCR parameter and a corresponding MBS parameter, in addition to a PCR and a corresponding CDVT for the CLP=0+1 flow. Conformance is defined based on the Generic Cell Rate Algorithm (GCRA).

The terms used hereafter are defined as follows:

TET_PCR is the PCR theoretical emission time of a cell
PCR_INC=1/PCR
TET_SCR is the SCR theoretical emission time of a cell
SCR_INC=1/SCR
BT=(MBS−1)×(1/SCR−1/PCR)
Time_Now is the current time slot
(Time_Now+1) is the next time slot
Conf is the conformance time of a cell
Schedule_Time is the time at which the cell should be serviced At initialization:
TET_PCR=−PCR_INC
TET_SCR=−SCR_INC When a new cell reaches the Head of Line (HOL) position:

(A) TET_PCR=MAX(TET_PCR+PCR_INC, Time_Now+1)

(B) TET_SCR=MAX(TET_SCR+SCR_INC, Time_Now+1)

(C) Conf=MAX(TET_SCR−BT, Time_Now+1)

(D) Schedule_Time=MAX(TET_PCR, Conf)

(E) TET_PCR=Schedule_Time (F) TET_SCR=MAX(Schedule_Time, TET_SCR)

Now, in order to simplify the process of recognizing clock wrap around, TET_PCR is restrained to be within the 2nd and 3rd quadrant by moving any TET_PCR values from the 4th quadrant into the 2nd quadrant. TET_SCR is also restrained to be within the 2nd, 3rd, or 4th quadrant by bounding the burst tolerance (BT) to be less than the length of one quadrant—maximum SCR_INC. These restrictions allow a set of rules to be constructed to detect clock wrap around, ensure the value returned by the maximum function is always valid, and provide a simple implementation for the MTSM.

Figure 12:
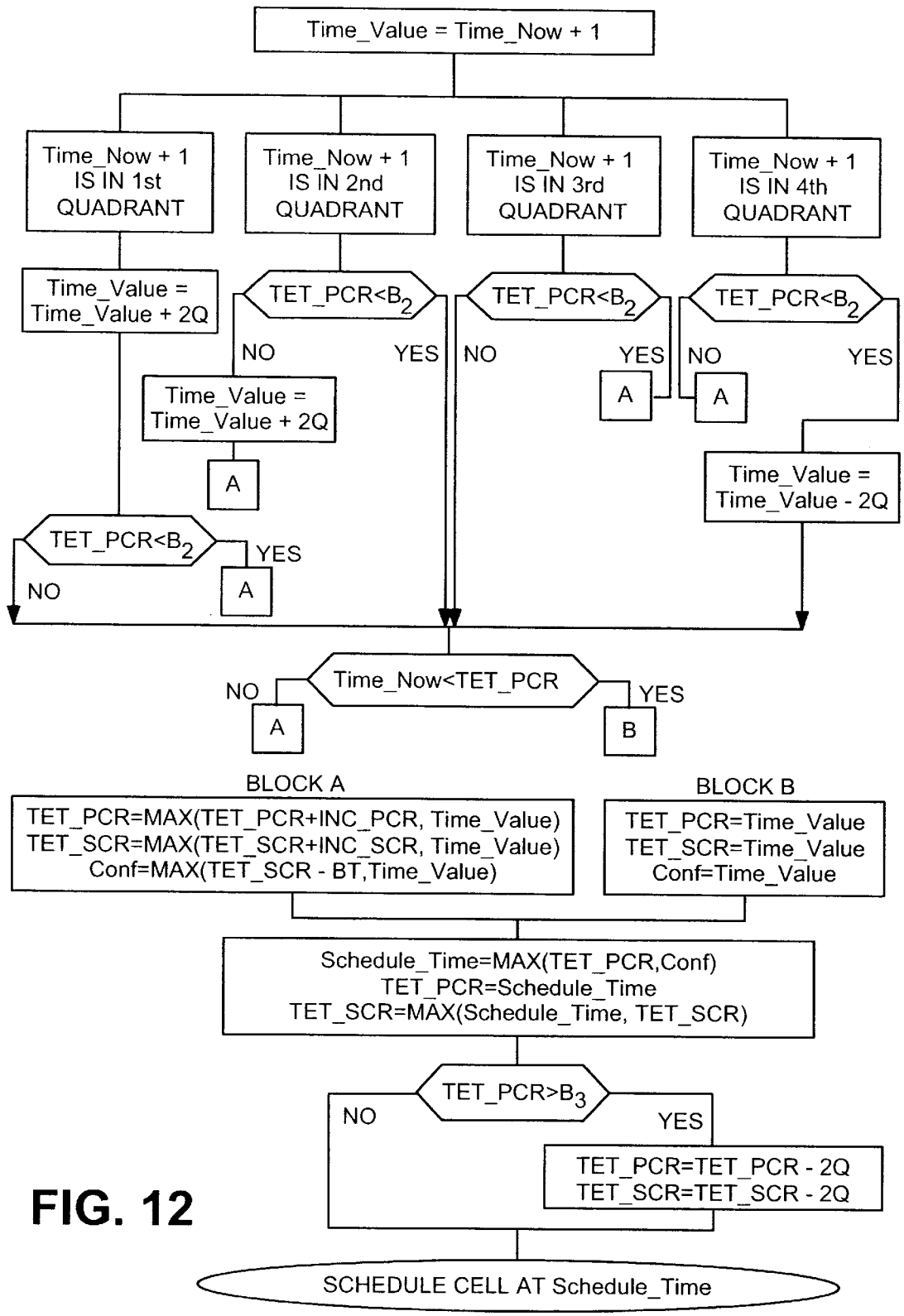
FIG. 12 depicts an algorithm for shaping VBR category of service traffic.

The following describes the set of rules implemented by the shaping algorithms of the present invention to detect clock wrap around and to ensure that the value returned by the maximum function is always valid. The first shaping algorithm described relates to real time and non-real time VBR service and a flow chart form of the algorithm is shown in FIG. 12. The CBR, ABR and UBR shaping algorithm is discussed later and illustrated in flow chart format in FIG. 13.

When a VBR connection is configured, TET_PCR and TET_SCR are initialized to $B_1$, the boundary of the first quadrant. As noted in FIG. 5 the next time slot location on the calendar register is compared with the location of TET_PCR and this relationship is used to determine whether clock wrap around has occurred and consequently whether the maximum function used to calculate the service time is valid.

The following discussion in conjunction with FIGS. 5 to 11 sets out the step involved in implementing the algorithm whenever a new cell reaches the head of a queue.

Figure 5:
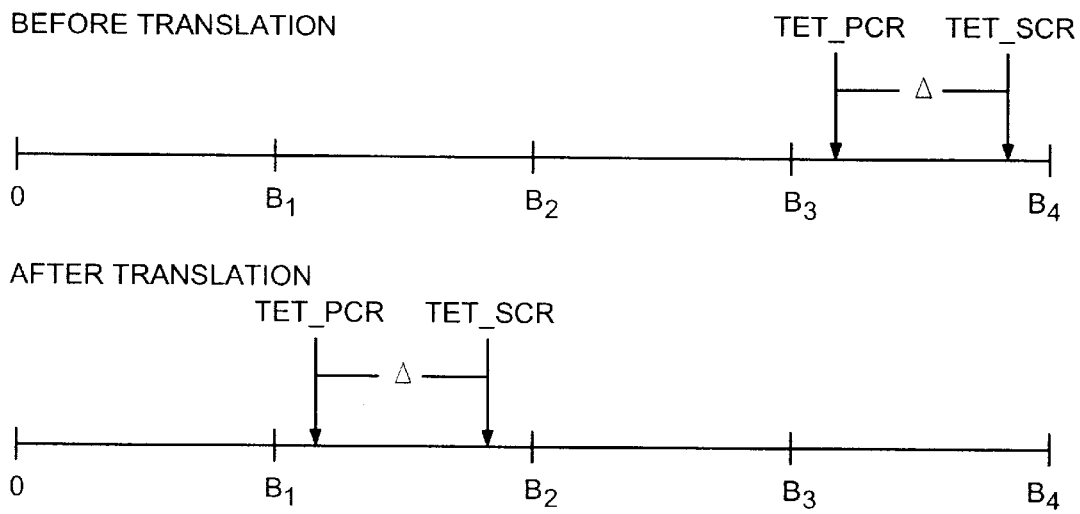
FIGS. 5 to 11 show relationship of TET_PCR, TET_SCR and Time_Now+1 for various scenarios.

Referring initially to FIG. 5, suppose, after updating TET_PCR and TET_SCR, that TET_PCR lies within the 4th quadrant. In order to prevent TET_PCR wrap around, TET_PCR is translated into the 2nd quadrant, that is, 2×the length of one quadrant is subtracted from TET_PCR. Since only the most significant bits of TET_PCR=Schedule_Time are used to schedule a cell onto the physical calendar of the MTSM, translating TET_PCR can be done without any side effects, as long as TET_SCR is also translated. TET_SCR must be translated to maintain the difference, denoted by Δ, between TET_SCR and TET_PCR. Now suppose that Time_Now+1 and TET_PCR are both in the second quadrant. It is known that a wrap around time has occurred if Time_Now<TET_PCR since a cell can never be scheduled in the past and TET_PCR=Schedule_Time. A wrap around of Time_Now will occur if there have been collisions or if the connection has been idle. Thus, when Time_Now<TET_PCR, by (A), TET_PCR must be set to Time_Now+1. Otherwise, both Time_Now and TET_PCR are within valid ranges and we can take the maximum function.

Suppose Time_Now+1is in the 3rd quadrant and TET_PCR is in the 2nd quadrant (not shown). This is known to be a normal situation for which the maximum function can be taken.

Figure 6:
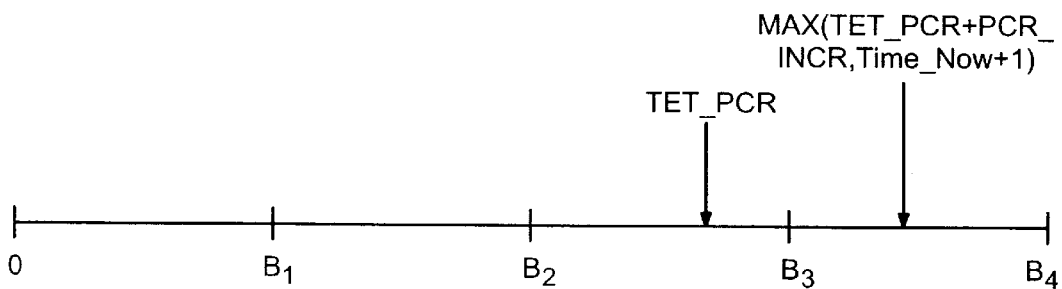
Figure 7:
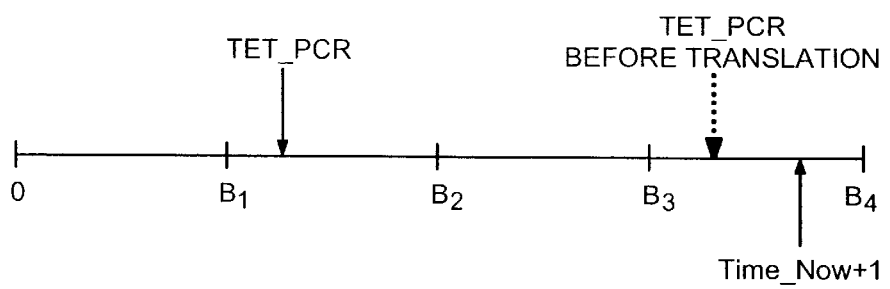

Referring now to FIGS. 6 and 7, suppose Time_Now+1 is in the 4th quadrant and TET_PCR is in the 2nd quadrant. Consider the infinite time line case and suppose TET_PCR is in the 3rd quadrant and MAX(TET_PCR+PCR_INC, Time_Now+1) is in the 4th quadrant, as shown in FIG. 6. As described above, the newly calculated TET_PCR must be translated into the 2nd quadrant. Suppose Time_Now+1 is in the 4th quadrant when a new cell reaches the HOL position. FIG. 7 shows the state of the registers as seen by the MTSM. If TET_PCR would not have been translated, Time_Now+1 would be in the same quadrant as TET_PCR. In order to reflect the fact that TET_PCR was translated and to maintain the difference between TET_PCR and Time_Now+1 accurate as if a translation had not occurred, we must also translate Time_Now+1, that is, subtract 2×length of one quadrant from Time_Now+1. Since we don't want to modify the Time_Now+1 value, we store the translated value of Time_Now+1 into a temporary register and use this temporary register to calculate the maximum between Time_Now+1 translated and TET_PCR+PCR_INC. Now suppose that Time_Now+1 is in the 4th quadrant but TET_PCR has not been translated. This situation can only be detected if, once Time Now+1 is translated, Time_Now+1 <TET PCR. This condition identifies a wrap around of Time_Now of $B3$ time slots in which case, TET_PCR must be set to the translated value of Time_Now+1. If the wrap around is greater than $B4$ time slots then this wrap around cannot be detected and the algorithm will continue as if it was in a valid situation. As a consequence, cells may not be sent at 1/PCR when they are allowed.

Figure 8:
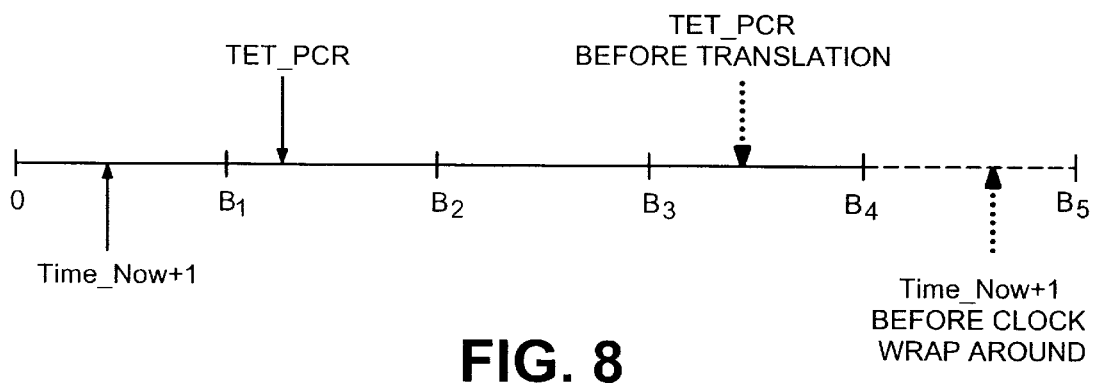

Referring now to FIG. 8, suppose Time_Now+1 is in the 1st quadrant and TET_PCR is in the 2nd quadrant. Consider the infinite time line case and suppose TET_PCR is in the 3rd quadrant and MAX(TET_PCR+PCR_INC, Time_Now+1) is in the 4th quadrant, as shown in FIG. 6. As described previously, the newly calculated TET_PCR must be translated into the 2nd quadrant. Suppose Time_Now+1 is in the 5th (virtual) quadrant when a new cell reaches the HOL position, which means Time_Now+1 has wrapped around into the 1st quadrant. FIG. 8 shows the state of the registers as seen by the MTSM. If TET_PCR would not have been translated and if Time_Now+1 would not have wrapped around, Time_Now+1 would be in the next quadrant of TET_PCR. In order to reflect the fact that TET_PCR was translated and that Time_Now+1 wrapped around, and to maintain the difference between TET_PCR and Time_Now+1 accurate as if a translated and a wrapped around had not occurred, we must translate Time_Now+1 into the 3rd quadrant, that is, add (2×length of one quadrant) to Time_Now+1. Since we don't want to modify the Time_Now+1 value, we store the translated value of Time_Now+1 into a temporary register and use this temporary register to calculate the maximum between Time_Now+1 translated and TET_PCR+PCR_INC.

Suppose Time Now+1 and TET_PCR are both in the 3rd quadrant (not shown). We know a wrap around of Time_Now has occurred if Time_Now<TET_PCR since a cell can never be scheduled in the past and TET_PCR=Schedule_Time. A wrap around of Time_Now will occur if there have been collisions or if the connection has been idle. Thus, when Time_Now<TET_PCR, then by (A), TET_PCR must be set to Time Now+1. Otherwise, both Time_Now and TET_PCR are within valid ranges and we can take the maximum function.

Suppose Time_Now+1 is in the 4th quadrant and TET_PCR is in the 3rd quadrant (not shown). This is a normal situation for which the maximum function can be taken.

Figure 9:
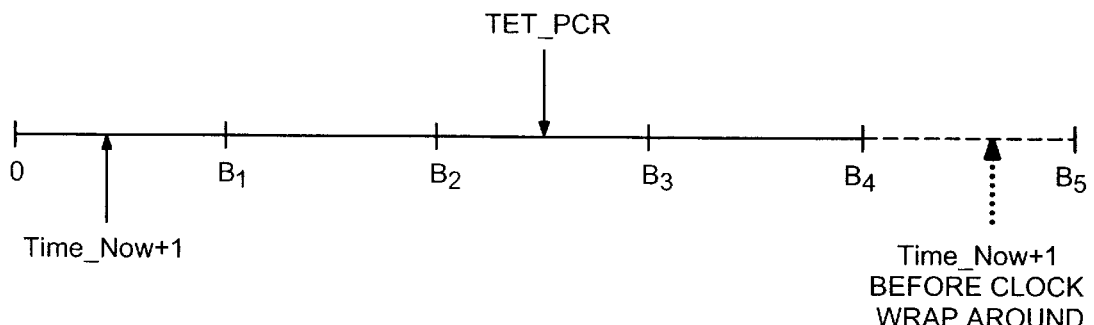
Figure 10:
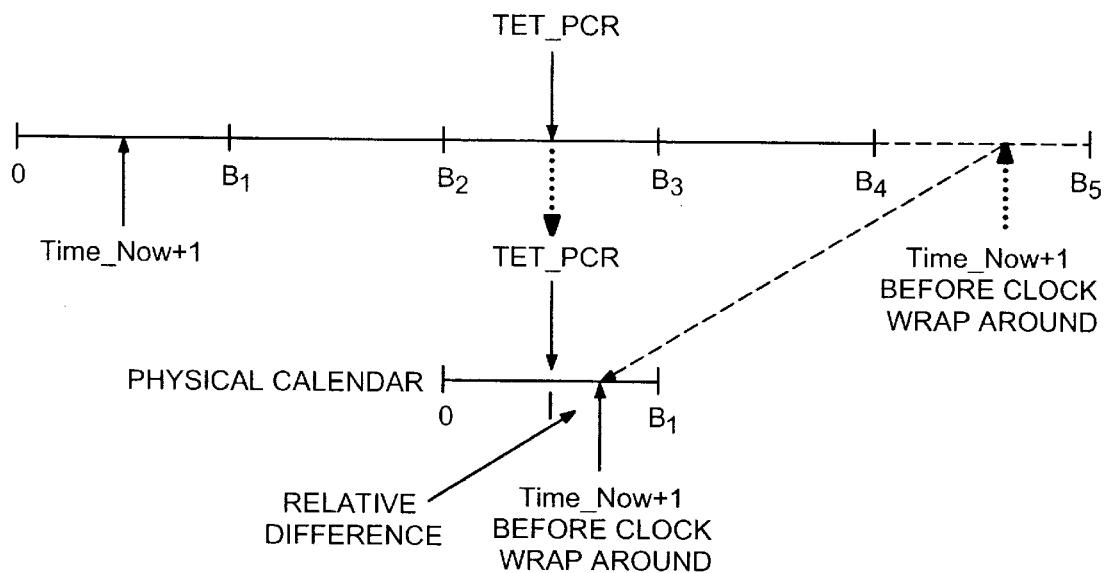

Referring now to FIG. 9, suppose Time_Now+1 is in the 1st quadrant and TET_PCR is in the 3rd quadrant. Consider the infinite time line case and suppose Time_Now+1 is in the 5th quadrant when a new cell reaches the HOL position, which means Time_Now+1 has wrapped around into the 1st quadrant. FIG. 9 shows the state of the registers as seen by the MTSM. If Time_Now+1 would not have wrapped around, Time_Now+1 would be in the next quadrant of TET_PCR. In order to reflect the fact that Time_Now+1 wrapped around, and to maintain the relative difference between TET_PCR and Time_Now+1 accurate as if a wrapped around had not occurred, we must translate Time_Now+1 into the 3rd quadrant, that is, add (2×length of one quadrant) to Time_Now+1. Given that only the most significant bits of TET_PCR=Schedule_Time are used to schedule a cell onto the physical calendar of the MTSM, then translating Time_Now+1 maintains the relative difference between TET_PCR and Time_Now+1 onto the physical calendar, as shown in FIG. 10. Since we don't want to modify the Time_Now+1 value, we store the translated value of Time_Now+1 into a temporary register and use this temporary register to calculate the maximum between Time_Now+1 translated and TET_PCR+PCR_INC. Now suppose that Time_Now+1 is in the 1st quadrant but, once Time_Now+1 is translated, Time_Now+1<TET_PCR. This condition identifies a wrap around of Time_Now+1 due to collisions or the connection has been idle in which case, TET_PCR must be set to the translated value of Time_Now+1. Note that if the wrap around is greater than B4 time slots then this wrap around cannot be detected and the algorithm will continue as if it was in a valid situation. As a consequence, cells may not be sent at 1/PCR when they are allowed.

Figure 11:
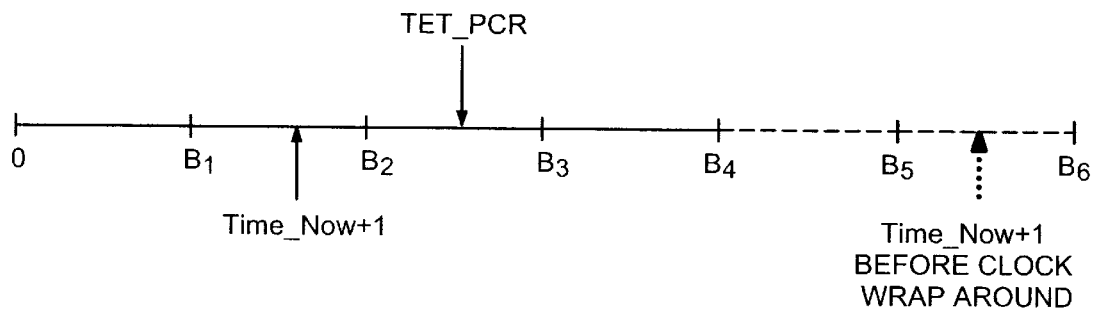

As shown in FIG. 11, suppose Time_Now+1 is in the 2nd quadrant and TET_PCR is in the 3rd quadrant. Consider the infinite time line case and suppose Time_Now+1 is in the 6th quadrant when a new cell reaches the HOL position, which means Time_Now+1 has wrapped around into the 2nd quadrant. FIG. 11 shows the state of the registers as seen by the MTSM. If Time_Now+1 would not have wrapped around, Time_Now+1 would be ahead of TET_PCR. In order to reflect the fact that Time_Now+1 wrapped around, and to maintain the relative difference between TET_PCR and Time_Now+1 accurate as if a wrapped around had not occurred, we must translate Time_Now+1 into the 4th quadrant, that is, add (2×length of one quadrant) to Time_Now+1. Given that only the most significant bits of TET_PCR=Schedule_Time are used to schedule a cell onto the physical calendar of the MTSM, then translating Time_Now+1 maintains the relative difference between TET_PCR and Time_Now+1 onto the physical calendar, as shown in FIG. 10. Since we don't want to modify the Time_Now+1 value, we store the translated value of Time_Now+1 into a temporary register and use this temporary register to calculate the maximum between Time_Now+1 translated and TET_PCR+PCR_INC.

Given that the burst tolerance of a connection is bounded by length of one quadrant—maximum SCR_INC, given the difference between TET_SCR and TET_PCR is always less than BT+SCR_INC (since TET_PCR=Schedule_Time), and given that TET_PCR and TET_SCR are translated as soon as TET_PCR lies within the 4th quadrant, then we do not need a set of rules for TET_SCR since TET_SCR will not wrap around.

These sets of rules are combined into the flow chart of FIG. 12 and represent the VBR shaping algorithm implemented on the MTSM.

Experiments indicate that the foregoing VBR shaping algorithm yields a conformant cell stream and, to the extent possible, maintains the sustained cell rate requested.

It should be noted, however, that a downstream UPC may not receive MBS cells at 1/PCR if the burst tolerance for that connection has been truncated. As mentioned previously, the burst tolerance is preferably less than the length of one quadrant—maximum SCR_INC; as a consequence, the number of cells set at 1/PCR may be limited by BT, and may thus be smaller than the requested MBS cells.

Additionally, a downstream UPC may not receive MBS cells at 1/PCR if the connection has been idle for more than B4 time slots. As Time_Now+1 wraps around past TET_PCR, the VBR shaping algorithm may not detect a clock wrap around and continues as if the connection had never been idle.

A downstream UPC may detect non-conformant cells to the PCR bucket due to accrued collisions. Collisions can occur when multiple cells, from different connections, become eligible for transmission during the same time slot. The VBR shaping algorithm allows cells to be transmitted at line rate in order to maintain the PCR rate. If the CDVT value on the downstream UPC is smaller than 1/PCR than cells may be detected as non-conformant. Observe that if collisions occur, it is not a sufficient condition to conclude cells will be non-conformant to the PCR bucket. In experiments collisions occur and yet all cells may be conformant to both buckets.

As specified in the Traffic Management Specification V4.0 conformance for a ABR connection is network specific while conformance for a CBR and UBR connection is characterized by a PCR parameter with a corresponding CDVT for the CLP=0+1 flow. Conformance is defined based on the Generic Cell Rate (GCRA). The following describes a CBR, ABR, and UBR shaping algorithm on the MTSM.

Figure 13:
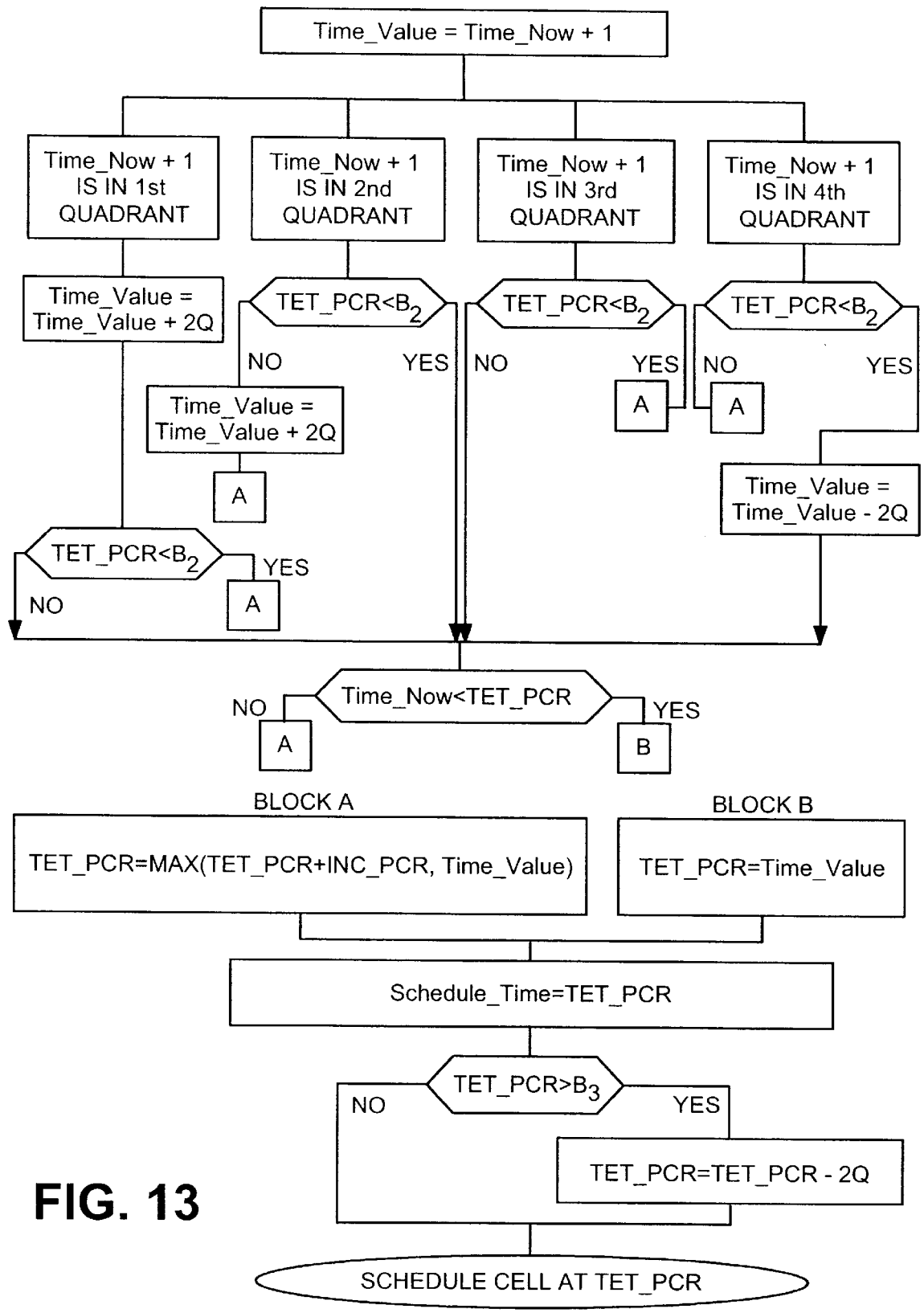
FIG. 13 depicts an algorithm for shaping CBR, ABR and UBR categories of service traffic.

Initialization:
TET_PCR=-PCR_INC
A new cell reaches the HOL position;
TET_PCR=MAX(TET_PCR+PCR_INC, Time Now+1)
Schedule_Time=TET_PCR Similar to the VBR shaping algorithm, this alternative algorithm needs to be adapted to the MTSM card. FIG. 13 shows in a flow chart format the implementation of the CBR, ABR, UBR algorithm for the MTSM.

Although performance results have shown that the algorithm yields a conformant cell stream and maintains the sustained cell rate requested under certain conditions a downstream UPC could detect non-conformant cells due to accrued collisions. This shaping algorithm allows cells to be transmitted at line rate in order to maintain the PCR rate. If the CDVT value on the downstream UPC is smaller than 1/PCR, cells may be detected as non-conformant. If collisions occur, it is not a sufficient condition to conclude cells will be non-conformant to the PCR buckets.

While embodiments of the invention have been described and illustrated it will be apparent to one skilled in the art that numerous changes to the basic concept can be implemented. It is to be understood, however that such changes will fall within the true scope of the invention as defined by the appended claims.

What is claimed is:

1. A method of shaping cell traffic at a queuing system for conformance with downstream traffic descriptors comprising: providing a calendar system having a register with a plurality of time slots for indicating emission times of cells awaiting service; limiting the register to positive values;

dividing the positive time slot register into quadrants; comparing quadrant location of a theoretical emission time of a cell on said register with quadrant location of a next cell service time slot; and determining a scheduled emission time based on the comparison.

2. A method as defined in claim 1 wherein said cell traffic is shaped to conform to a Peak Cell Rate (PCR) value and a Cell Delay Variation Tolerance (CDVT) according to a Generic Cell Rate Algorithm (GCRA).

3. A method as defined in claim 2 wherein said cell traffic has a Constant Bit Rate category of service.

4. A method as defined in claim 2 wherein said cell traffic has an Unspecified Bit Rate (UBR) category of Service.

5. A method as defined in claim 2 wherein said cell traffic has an Available Bit Rate (ABR) category of service.

6. A method as defined in claim 2 wherein said cell traffic is additionally conformed to Sustained Cell Rate (SCR) and Burst Tolerance (BT) and Cell Delay Variation Tolerance (CDVT) values.

7. A method as defined in claim 6 wherein said cell traffic has a real time Variable Bit Rate (rt-VBR) category of service.

8. A method as defined in claim 6 wherein said cell traffic has a non-real time Variable Bit Rate (nrt-VBR) category of service.

9. A queuing system having a shaper for conforming Asynchronous Transfer Mode ATM cell traffic to traffic descriptors comprising: a calendar register in said shaper having a plurality of time slots for indicating servicing sequences of cell traffic awaiting service; means to constrain said calendar register to positive time values; means to divide said positive time values into quadrants; means to calculate a Theoretical Emission Time (TET) of a cell based on Peak Cell Rate (PCR) and Cell Delay Variation Tolerance (CDVT) parameters; and means to compare said TET_PCR with a next time slot location on said register to determine the scheduled service time of a cell.

10. A queuing system as defined in claim 9 for shaping Constant Bit Rate (CBR) category of service traffic.

11. A queuing system as defined in claim 9 for shaping Unspecified Bit Rate (UBR) category of service traffic.

12. A queuing system as defined in claim 9 for shaping Available Bit Rate (ABR) category of service.

13. A queuing system as defined in claim 9 further including means to calculate a Theoretical Emission Time of a cell additionally based on Sustained Cell Rate (SCR) and Burst Tolerance and CDVT parameters.

14. A queuing system as defined in claim 11 for shaping Variable Bit Rate (VBR) category of service traffic.

* * * * *